United States Patent
Cook et al.

(10) Patent No.: US 11,102,256 B2
(45) Date of Patent: Aug. 24, 2021

(54) SYSTEM AND METHOD FOR DYNAMIC CLOUD FORMATIONS FOR STREAM COMPUTING

(71) Applicant: International Business Machines Corporation, Armonk, NY (US)

(72) Inventors: Alexander Cook, Rochester, MN (US); Cory J. Kleinheksel, Ames, IA (US); David M. Koster, Rochester, MN (US); Jason A. Nikolai, Rochester, NY (US)

(73) Assignee: International Business Machines Corporation, Armonk, NY (US)

(*) Notice: Subject to any disclaimer, the term of this patent is extended or adjusted under 35 U.S.C. 154(b) by 348 days.

(21) Appl. No.: 15/468,464

(22) Filed: Mar. 24, 2017

(65) Prior Publication Data
US 2018/0278663 A1    Sep. 27, 2018

(51) Int. Cl.
*H04L 29/06* (2006.01)
*H04L 29/08* (2006.01)

(52) U.S. Cl.
CPC .......... *H04L 65/4069* (2013.01); *H04L 67/10* (2013.01)

(58) Field of Classification Search
CPC ........................... H04L 65/4069; H04L 67/10
USPC ................................................ 709/203–206
See application file for complete search history.

(56) References Cited

U.S. PATENT DOCUMENTS

| | | | |
|---|---|---|---|
| 9,389,911 B2 * | 7/2016 | Branson | G06F 9/4887 |
| 10,042,891 B2 * | 8/2018 | Branson | G06F 16/24568 |
| 2008/0162590 A1 * | 7/2008 | Kundu | G06F 11/1471 |
| 2008/0256384 A1 * | 10/2008 | Branson | G06F 11/2025 |
| | | | 714/4.1 |
| 2009/0319687 A1 * | 12/2009 | Goldstein | G06F 9/5083 |
| | | | 709/241 |
| 2011/0041132 A1 * | 2/2011 | Andrade | G06F 9/5083 |
| | | | 718/102 |

(Continued)

OTHER PUBLICATIONS

Hirzel, Martin, Robert Soulé, Scott Schneider, Buğra Gedik, and Robert Grimm. "A catalog of stream processing optimizations." ACM Computing Surveys (CSUR) 46, No. 4 (2014): 46. (Year: 2014).*

(Continued)

*Primary Examiner* — Suraj M Joshi
*Assistant Examiner* — Melaku Y Habtemariam
(74) *Attorney, Agent, or Firm* — Reza Sarbakhsh

(57) ABSTRACT

A method, computer program product, and computer system for identifying, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. A first compute node of at least the portion of the plurality of voluntary compute nodes may be identified to receive and distribute a streams operator of a streams graph requested by a client computing device. A second compute node of at least the portion of the plurality of voluntary compute nodes may be identified for verifying computational correctness of a tuple stream computation for the stream operator by replicating the tuple stream computations for the stream operator on the second compute node. A final result tuples of the graph may be sent to the client computing device.

20 Claims, 8 Drawing Sheets

(56) References Cited

U.S. PATENT DOCUMENTS

| | | | |
|---|---|---|---|
| 2014/0289240 A1* | 9/2014 | Barsness | G06F 16/24568 707/736 |
| 2015/0081879 A1* | 3/2015 | Branson | H04L 45/24 709/224 |
| 2016/0269247 A1 | 9/2016 | Chakradhar et al. | |

OTHER PUBLICATIONS

Disclosed Anonymously, "IP.Com, Workload Optimization through Dynamic Reconfiguration of Compute Nodes," IP.Com No. IPCOM000215416D, IP.Com Electronic Publication Date: Feb. 26, 2012, pp. 1-3.

Disclosed Anonymously, "IP.Com, Cluster Energy Optimization in Cloud Computing," IP.Com No. IPCOM000238962D, IP.Com Elecronic Publication Date: Sep. 29, 2014, pp. 1-8.

Hummer et al., "Elastic Stream Processing in the Cloud," Wiley Wire, Wiley Interdisiplinary Reviews 2012; pp. 1-14.

IBM, World Community Grid, http://www-03.ibm.com/ibm/history/ibm100/us/en/icons/worldgrid.break, downloaded Feb. 1, 2017, pp. 1.

Bonomi et al., "Fog Computing and its role in the Internet of Things," MCC '12, Aug. 17, 2012; pp. 13-15.

Yang et al., "A Framework for Partitioning and Execution of Data Stream Applications in Mobile Cloud Computing," Performance Evaluation Review, vol. 40, No. 4, Mar. 2013, pp. 23-32.

"Everything You Need to Know About World Communicty Grid/BOINC," http://www.xtremesystems.org/forums/showthread.php?230613-Everything-You-Need-To-Know-About, downloaded Feb. 2, 2017, pp. 1-16.

\* cited by examiner

SYSTEM AND METHOD FOR DYNAMIC CLOUD FORMATIONS FOR STREAM COMPUTING

BACKGROUND

Stream computing may consist of, e.g., an operator graph, where an input stream of data may be processed by an operator, and potentially creating some output stream(s) to one or more additional operators. Generally, these stream computations may be performed on high performance clusters, as well as on the cloud.

BRIEF SUMMARY OF DISCLOSURE

In one example implementation, a method, performed by one or more computing devices, may include but is not limited to identifying, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. A first compute node of at least the portion of the plurality of voluntary compute nodes may be identified to receive and distribute a streams operator of a streams graph requested by a client computing device. A second compute node of at least the portion of the plurality of voluntary compute nodes may be identified for verifying computational correctness of a tuple stream computation for the stream operator by replicating the tuple stream computations for the stream operator on the second compute node. A final result tuples of the graph may be sent to the client computing device.

One or more of the following example features may be included. It may be determined whether to add additional tuples to further replicate one or more sections of the streams graph. At least one of the first and second compute nodes may be identified based upon, at least in part, one or more attributes of at least one of the first and second compute nodes. The one or more attributes may include one or more of geographic location, availability of memory resources, availability of CPU resources, connection speed, reputation, a threshold battery life, a battery charging state, and connection state to a wireless fidelity network. A graceful handover of the tuple stream computation may be performed to a third compute node of at least the portion of the plurality of voluntary compute nodes based upon, at least in part, at least a portion of the one or more attributes. A prioritized list of at least the portion of the plurality of voluntary compute nodes may be transmitted to at least one of the first and second compute nodes. Identification of the second compute node may be prioritized based upon, at least in part, the first compute node being in a different geographic region than the second compute node.

In another example implementation, a computing system may include one or more processors and one or more memories configured to perform operations that may include but are not limited to identifying, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. A first compute node of at least the portion of the plurality of voluntary compute nodes may be identified to receive and distribute a streams operator of a streams graph requested by a client computing device. A second compute node of at least the portion of the plurality of voluntary compute nodes may be identified for verifying computational correctness of a tuple stream computation for the stream operator by replicating the tuple stream computations for the stream operator on the second compute node. A final result tuples of the graph may be sent to the client computing device.

One or more of the following example features may be included. It may be determined whether to add additional tuples to further replicate one or more sections of the streams graph. At least one of the first and second compute nodes may be identified based upon, at least in part, one or more attributes of at least one of the first and second compute nodes. The one or more attributes may include one or more of geographic location, availability of memory resources, availability of CPU resources, connection speed, reputation, a threshold battery life, a battery charging state, and connection state to a wireless fidelity network. A graceful handover of the tuple stream computation may be performed to a third compute node of at least the portion of the plurality of voluntary compute nodes based upon, at least in part, at least a portion of the one or more attributes. A prioritized list of at least the portion of the plurality of voluntary compute nodes may be transmitted to at least one of the first and second compute nodes. Identification of the second compute node may be prioritized based upon, at least in part, the first compute node being in a different geographic region than the second compute node.

In another example implementation, a computer program product may reside on a computer readable storage medium having a plurality of instructions stored thereon which, when executed across one or more processors, may cause at least a portion of the one or more processors to perform operations that may include but are not limited to identifying, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. A first compute node of at least the portion of the plurality of voluntary compute nodes may be identified to receive and distribute a streams operator of a streams graph requested by a client computing device. A second compute node of at least the portion of the plurality of voluntary compute nodes may be identified for verifying computational correctness of a tuple stream computation for the stream operator by replicating the tuple stream computations for the stream operator on the second compute node. A final result tuples of the graph may be sent to the client computing device.

One or more of the following example features may be included. It may be determined whether to add additional tuples to further replicate one or more sections of the streams graph. At least one of the first and second compute nodes may be identified based upon, at least in part, one or more attributes of at least one of the first and second compute nodes. The one or more attributes may include one or more of geographic location, availability of memory resources, availability of CPU resources, connection speed, reputation, a threshold battery life, a battery charging state, and connection state to a wireless fidelity network. A graceful handover of the tuple stream computation may be performed to a third compute node of at least the portion of the plurality of voluntary compute nodes based upon, at least in part, at least a portion of the one or more attributes. A prioritized list of at least the portion of the plurality of voluntary compute nodes may be transmitted to at least one of the first and second compute nodes. Identification of the second compute node may be prioritized based upon, at least in part, the first compute node being in a different geographic region than the second compute node.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
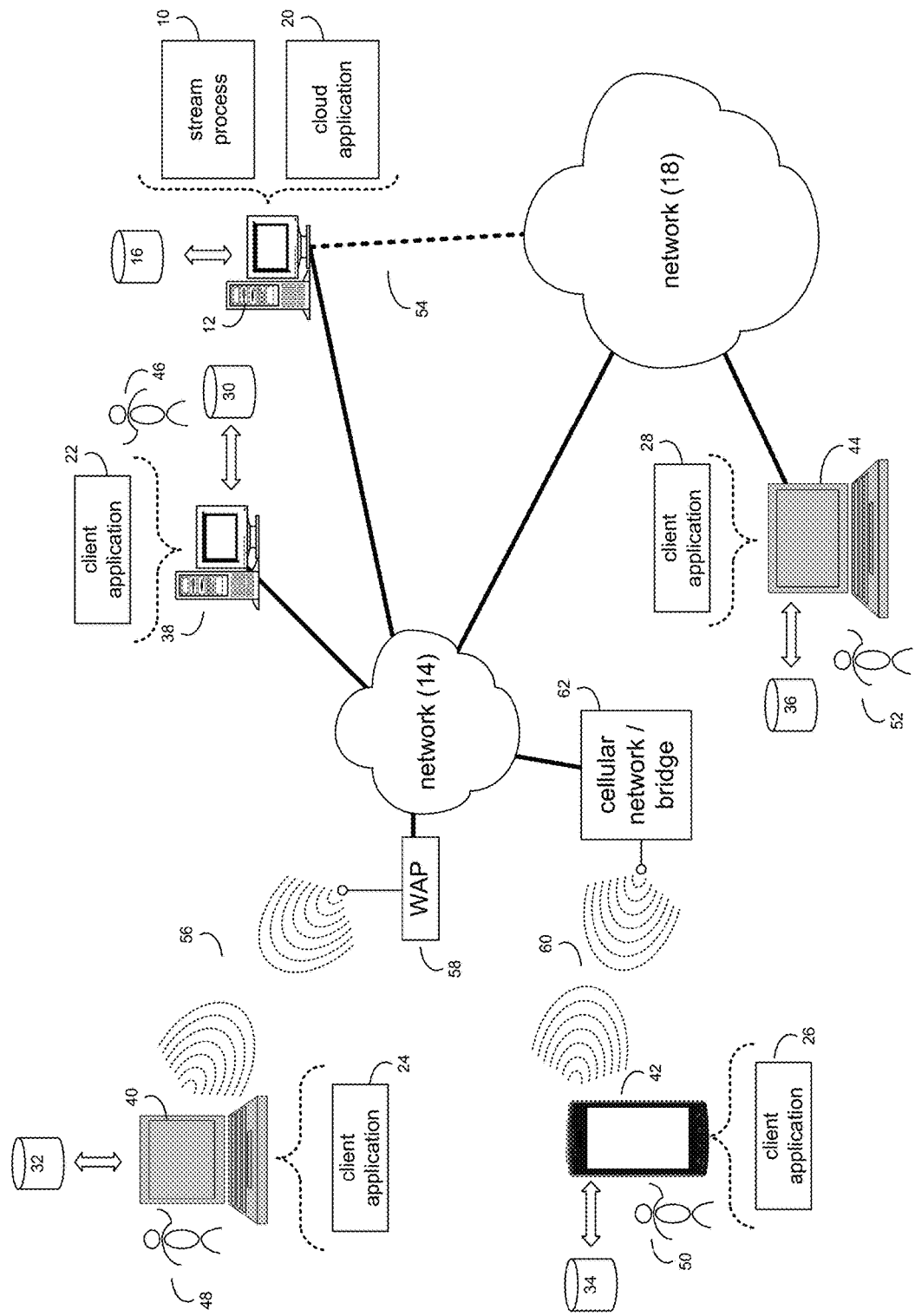
FIG. 1 is an example diagrammatic view of a stream process coupled to an example distributed computing network according to one or more example implementations of the disclosure.

System Overview:

Stream computing may consist of, e.g., an operator graph, where an input stream of data may be processed by an operator, and potentially creating some output stream(s) to one or more additional operators. Generally, these stream computations may be performed on high performance clusters, as well as on the cloud (e.g., via IBM® Streams). In some implementations, stream computing on the cloud may have the benefit of only having to pay for the resources needed at a particular instant, and may be able to scale up to match the processing demands of the input data streams.

Some distributed computing clusters may allow for voluntary sharing (and/or potential rewarding) of compute resources, which may be generally described as a peer-to-peer distributed computing cluster. Computations may be broken down into small, independent chunks and given to volunteers to compute. In some situations, a central authority may manage the distribution of work, as well as the verification and merging of results. It may be possible that if stream computing were to be enabled for such an environment (or similar/non-similar environment) additional challenges may arise. For example, communication latencies and execution paths may be considered for timely stream computation executions. As another example, a central authority performing result verification may be a bottleneck in the stream compute graph, not only for computation time, but also communication bandwidths.

As will be appreciated by one skilled in the art, aspects of the present disclosure may be embodied as a system, a method, and/or a computer program product at any possible technical detail level of integration. The computer program product may include a computer readable storage medium (or media) having computer readable program instructions thereon for causing a processor to carry out aspects of the present invention.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Computer program code for carrying out operations for aspects of the present disclosure may be written in any combination of one or more programming languages, including an object oriented programming language such as Java, Python, Scala, Ruby, and Node.js, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the example implementation of FIG. 1, there is shown stream process 10 that may reside on and may be executed by a computer (e.g., computer 12), which may be connected to a network (e.g., network 14) (e.g., the interne or a local area network). Examples of computer 12 (and/or one or more of the client electronic devices noted below) may include, but are not limited to, a personal computer(s), a laptop computer(s), mobile computing device(s), a server computer, a series of server computers, a mainframe computer(s), or a computing cloud(s). In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a stream process, such as stream process 10 of FIG. 1, may identify, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. A first compute node of at least the portion of the plurality of voluntary compute nodes may be identified to receive and distribute a streams operator of a streams graph requested by a client computing device. A second compute node of at least the portion of the plurality of voluntary compute nodes may be identified for verifying computational correctness of a tuple stream computation for the stream operator by replicating the tuple stream computations for the stream operator on the second compute node. A final result tuples of the graph may be sent to the client computing device.

In some implementations, the instruction sets and subroutines of stream process 10, which may be stored on storage device, such as storage device 16, coupled to computer 12, may be executed by one or more processors (not shown) and one or more memory architectures included within computer 12. In some implementations, storage device 16 may include but is not limited to: a hard disk drive; a flash drive, a tape drive; an optical drive; a RAID array (or other array); a random access memory (RAM); and a read-only memory (ROM).

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, stream process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a cloud application (e.g., cloud application 20), examples of which may include, but are not limited to, e.g., IBM® Streams, or other application that allows for stream computations that may be performed on high performance clusters, as well as on the cloud. In some implementations, stream process 10 and/or cloud application 20 may be accessed via one or more of client applications 22, 24, 26, 28. In some implementations, stream process 10 may be a standalone application, or may be an applet/application/script/extension that may interact with and/or be executed within cloud application 20, a component of cloud application 20, and/or one or more of client applications 22, 24, 26, 28. In some implementations, cloud application 20 may be a standalone application, or may be an applet/application/script/extension that may interact with and/or be executed within stream process 10, a component of stream process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of stream process 10 and/or cloud application 20. Examples of client applications 22, 24, 26, 28 may include, but are not limited to, e.g., IBM® Streams, or other application that allows for stream computations that may be performed on high performance clusters, as well as on the cloud, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet (not shown), a server (not shown), a television (not shown), a smart television (not shown), a media (e.g., video, photo, etc.) capturing device (not shown), and a dedicated network device (not shown). Client electronic devices 38, 40, 42, 44 may each execute an operating system, examples of which may include but are not limited to, Android™, Apple® iOS®, Mac® OS X®; Red Hat® Linux®, or a custom operating system.

In some implementations, one or more of client applications 22, 24, 26, 28 may be configured to effectuate some or all of the functionality of stream process 10 (and vice versa). Accordingly, in some implementations, stream process 10 may be a purely server-side application, a purely client-side application, or a hybrid server-side/client-side application that is cooperatively executed by one or more of client applications 22, 24, 26, 28 and/or stream process 10.

In some implementations, one or more of client applications 22, 24, 26, 28 may be configured to effectuate some or all of the functionality of cloud application 20 (and vice versa). Accordingly, in some implementations, cloud application 20 may be a purely server-side application, a purely client-side application, or a hybrid server-side/client-side application that is cooperatively executed by one or more of client applications 22, 24, 26, 28 and/or cloud application 20. As one or more of client applications 22, 24, 26, 28, stream process 10, and cloud application 20, taken singly or in any combination, may effectuate some or all of the same functionality, any description of effectuating such functionality via one or more of client applications 22, 24, 26, 28, stream process 10, cloud application 20, or combination thereof, and any described interaction(s) between one or more of client applications 22, 24, 26, 28, stream process 10, cloud application 20, or combination thereof to effectuate such functionality, should be taken as an example only and not to limit the scope of the disclosure.

In some implementations, one or more of users 46, 48, 50, 52 may access computer 12 and stream process 10 (e.g., using one or more of client electronic devices 38, 40, 42, 44) directly through network 14 or through secondary network 18. Further, computer 12 may be connected to network 14 through secondary network 18, as illustrated with phantom link line 54. Stream process 10 may include one or more user interfaces, such as browsers and textual or graphical user interfaces, through which users 46, 48, 50, 52 may access stream process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

Figure 2:
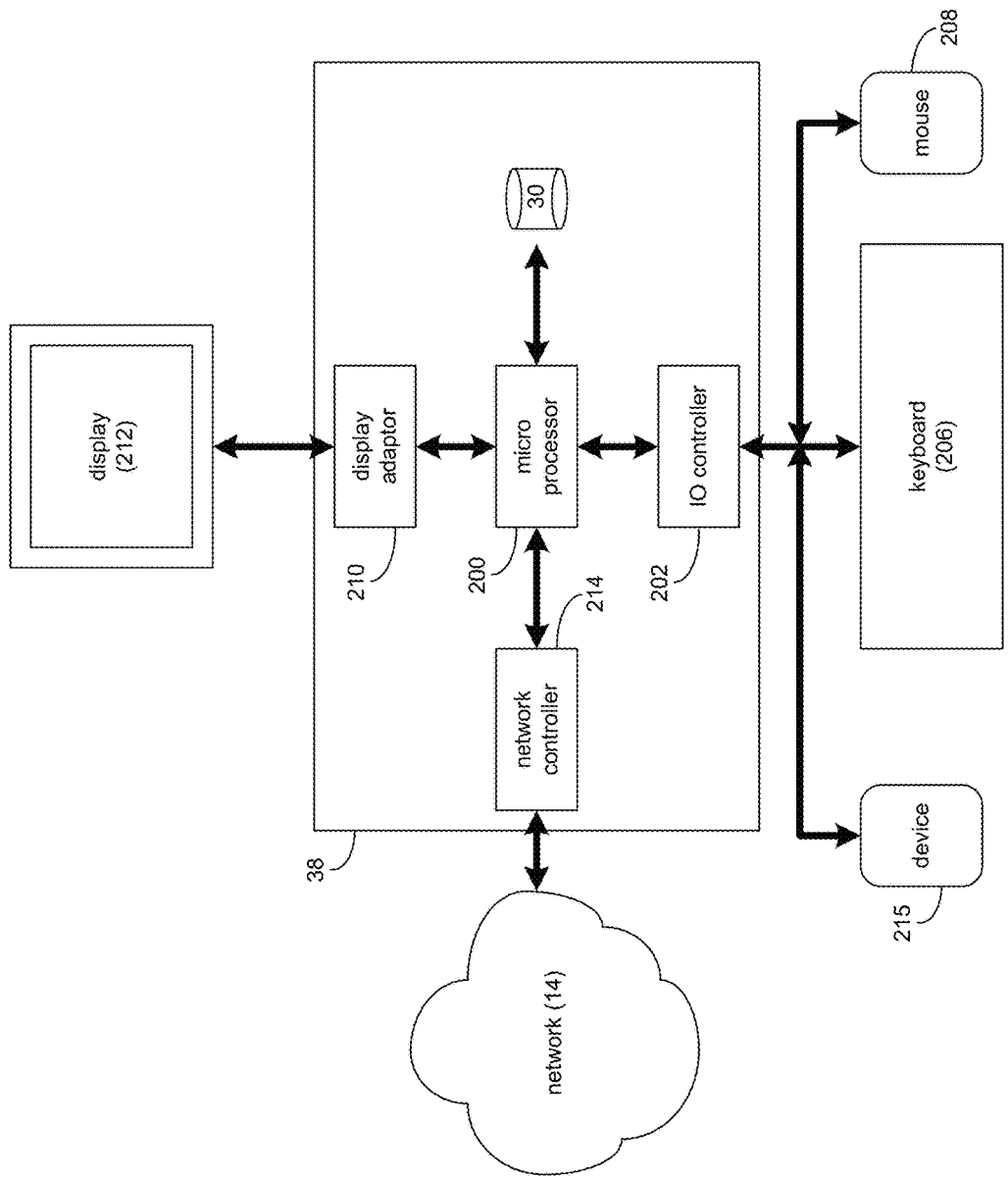
FIG. 2 is an example diagrammatic view of a client electronic device of FIG. 1 according to one or more example implementations of the disclosure.
Figure 3:
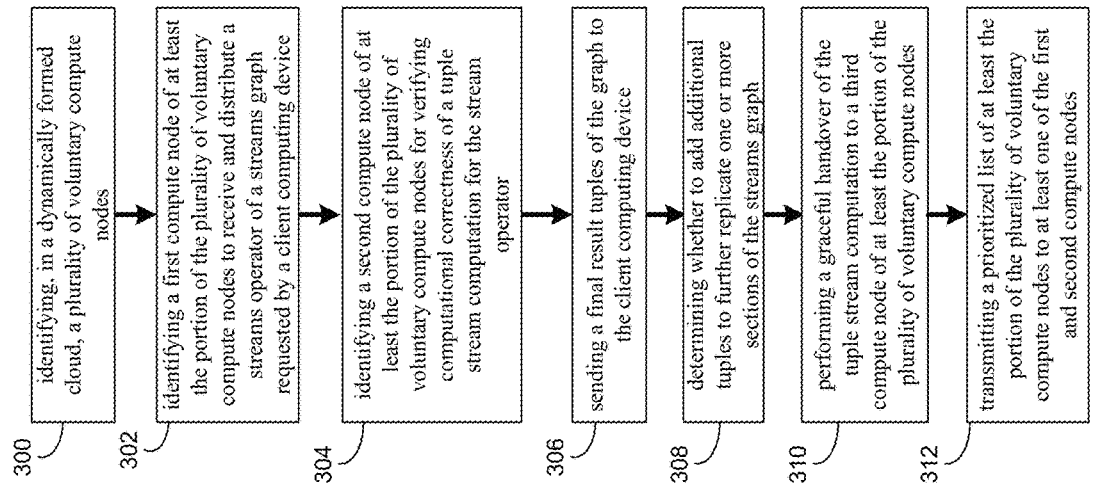
FIG. 3 is an example flowchart of a stream process according to one or more example implementations of the disclosure.
Figure 4:
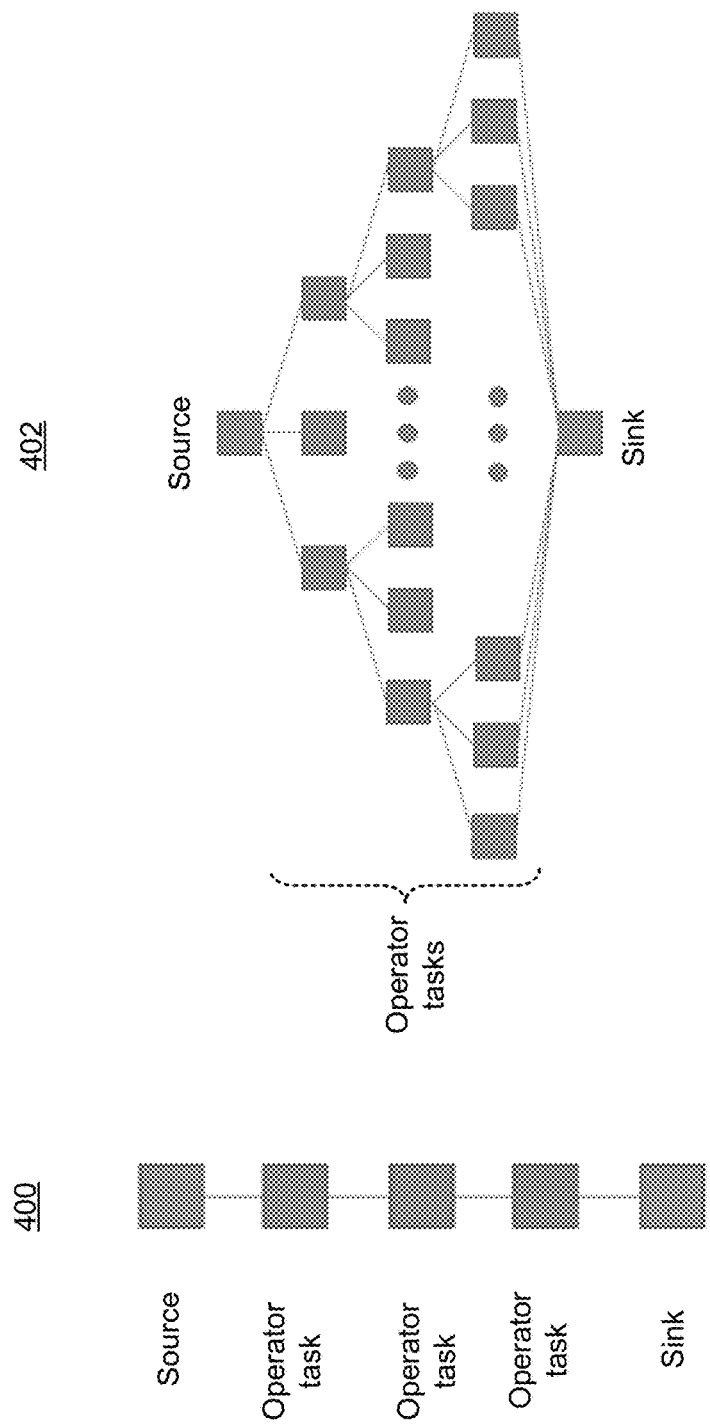
FIG. 4 is an example diagrammatic view of stream graphs.
Figure 5:
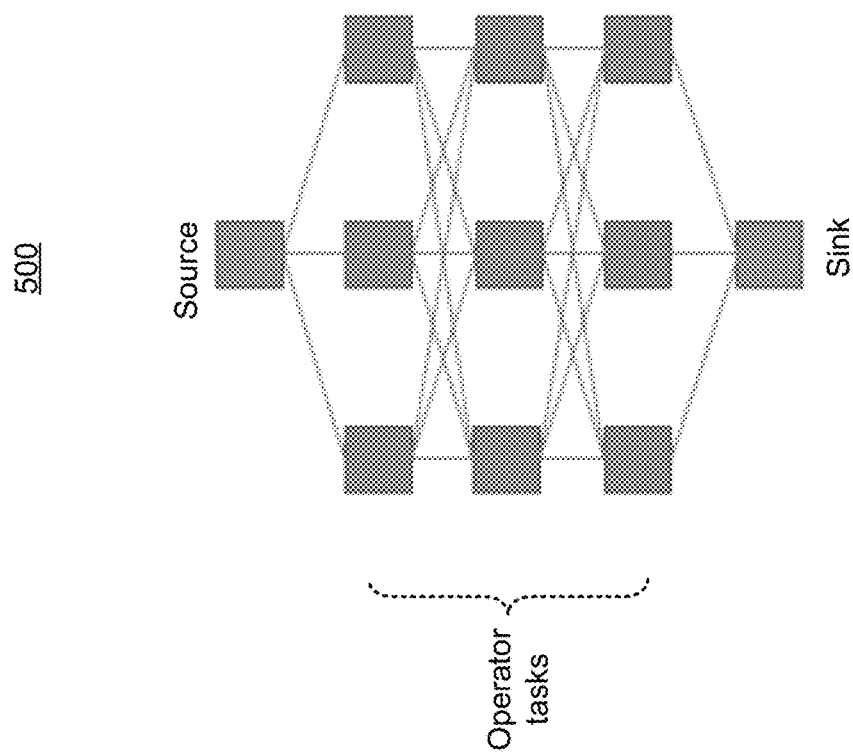
FIG. 5 is an example diagrammatic view of stream graphs according to one or more example implementations of the disclosure.

Referring also to the example implementation of FIG. 2, there is shown a diagrammatic view of client electronic device 38. While client electronic device 38 is shown in this figure, this is for example purposes only and is not intended to be a limitation of this disclosure, as other configurations are possible. Additionally, any computing device capable of executing, in whole or in part, stream process 10 may be substituted for client electronic device 38 (in whole or in part) within FIG. 2, examples of which may include but are not limited to computer 12 and/or one or more of client electronic devices 38, 40, 42, 44.

In some implementations, client electronic device 38 may include a processor and/or microprocessor (e.g., microprocessor 200) configured to, e.g., process data and execute the above-noted code/instruction sets and subroutines. Microprocessor 200 may be coupled via a storage adaptor (not shown) to the above-noted storage device(s) (e.g., storage device 30). An I/O controller (e.g., I/O controller 202) may be configured to couple microprocessor 200 with various devices, such as keyboard 206, pointing/selecting device (e.g., touchpad, touchscreen, mouse 208, etc.), custom device (e.g., device 215), USB ports (not shown), and printer ports (not shown). A display adaptor (e.g., display adaptor 210) may be configured to couple display 212 (e.g., touchscreen monitor(s), plasma, CRT, or LCD monitor(s), etc.) with microprocessor 200, while network controller/adaptor 214 (e.g., an Ethernet adaptor) may be configured to couple microprocessor 200 to the above-noted network 14 (e.g., the Internet or a local area network).

As will be discussed below, stream process 10 may at least help, e.g., improve existing technological processes associated with cloud based stream operation technology, necessarily rooted in computer technology in order to overcome a problem specifically arising in the realm of cloud based computer networks.

The Stream Process:

As discussed above and referring also at least to the example implementations of FIGS. 3-8, stream process 10 may identify 300, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. Stream process 10 may identify 302 a first compute node of at least the portion of the plurality of voluntary compute nodes to receive and distribute a streams operator of a streams graph requested by a client computing device. Stream process 10 may identify 304 a second compute node of at least the portion of the plurality of voluntary compute nodes for verifying computational correctness of a tuple stream computation for the stream operator by replicating the tuple stream computations for the stream operator on the second compute node. Stream process 10 may send 306 a final result tuples of the graph to the client computing device.

In some implementations, stream process 10 may identify 300, in a dynamically formed cloud, a plurality of voluntary compute nodes, wherein the plurality of voluntary compute nodes may include personal computing devices of a plurality of users, and wherein at least a portion of the plurality of voluntary compute nodes may be configured to communicate with each other to receive and send streaming data. For example, in some implementations, stream process 10 may be executed with similar features as traditional stream computing in a cluster (e.g., stream process 10 may treat volunteer clients (e.g., client electronic devices 38, 40, 42, 44, etc.) as compute resources that stream process 10 may allocate to specific compute jobs). In some implementations, volunteers (e.g., users 46, 48, 50, 52, etc.) may (via stream process 10) download and install, e.g., a client application to their respective above-noted client electronic devices, which may, among other things, identify 300 to stream process 10 their personal client electronic devices as a volunteer compute node. Volunteer users (via stream process 10) may offer the use of their client electronic device resources when they are either not being used or being underutilized. The distribution of a streams operator may occur through the client application (and/or stream process 10) that may download and execute computation jobs. As will be discussed below, the data input to the blocks may be received from one or more specified sources and then communicated to one or more specified sinks.

In some implementations, stream process 10 may identify 302 a first compute node of at least the portion of the plurality of voluntary compute nodes to receive and distribute a streams operator of a streams graph requested by a client computing device. In some implementations, stream process 10 may identify 304 a second compute node of at least the portion of the plurality of voluntary compute nodes for verifying computational correctness of a tuple stream computation for the stream operator by replicating the tuple stream computations for the stream operator on the second compute node.

At least one of the first and second compute nodes may be identified 302/304 based upon, at least in part, one or more attributes of at least one of the first and second compute nodes. In some implementations, the one or more attributes may include one or more of geographic location, availability of memory resources, availability of CPU resources, connection speed, reputation, a threshold battery life, a battery charging state, and connection state to a wireless fidelity network. For example, compute resources may vary in, e.g., CPU, memory, and scratch disk storage. In some implementations, stream process 10 may periodically examine the CPU performance and attributes of at least some of the volunteer computer nodes. In some implementations, stream process 10 may also monitor the available memory and temporary disk storage (as well as other resources and attributes) of at least some of the volunteer computer node. In some implementations, the volunteer compute nodes may on their own send this information to stream process 10 and/or stream process 10 may send queries for the information to the appropriate volunteer compute nodes to send the information. Some volunteers may have more limited resources than others and selection of volunteer nodes from the identified 302/304 volunteer nodes for some stream compute tasks may be limited by those.

In some implementations, unlike the "World Community Grid" which breaks computations into small compute jobs and sets a deadline for results to be returned, volunteers act completely independent, and can compute offline up until the deadline to return the results (which makes communication speed tests not very relevant), stream process 10 addresses stream computing, which computation latency may be a considerable factor. In some implementations, stream process 10 may periodically examine the stability of the data connection and the speed of the connection used by the volunteer compute nodes. In some implementations, both factors may play into whether a particular volunteer compute node is suitable for a particular stream compute task.

In some implementations, for a given streams job there may be cloud customer driven compute/communication requirements. These may be given by the customer directly or inferred from analysis of their job. Out of a global set of available volunteers, only those with their attributes (e.g., compute and communication resource statistics) that meet the specifications are considered for the job.

As noted above, in some implementations, threshold battery life, a battery charging state, and connection state to a wireless fidelity network may be some of the attributes considered by stream process 10 when identifying 302/304 (and/or selecting) which volunteer node to use for the compute job. Computations and communications may use valuable battery resources for the volunteer compute node. Although their idle resources may be valuable, so are their batteries. In some implementations, stream process 10 may only use resources of a volunteer compute node when its associated battery operated device is "plugged in" (i.e., charging) and/or fully charged (or at some threshold level of battery life remaining).

In some implementations, stream process 10 may perform 310 a graceful handover of the tuple stream computation to a third compute node of at least the portion of the plurality of voluntary compute nodes based upon, at least in part, at least a portion of the one or more attributes. For example, in some implementations, upon being unplugged (thus changing the battery charging state from charging to not charging), stream process 10 may not immediately quit, but may "gracefully" disconnect once the assigned computations may be migrated to another volunteer compute node. As another example, upon the battery life of the volunteer compute node reaching a threshold life remaining, stream process 10 may not immediately quit, but may "gracefully" disconnect once the assigned computations may be migrated to another volunteer compute node.

Data bandwidth, e.g., on mobile devices, often is more limited with speeds, more costly, and more likely to be subject to relatively small monthly quotas. In some implementations, connection state to a wireless fidelity network may be one of the attributes considered by stream process 10 when identifying 302/304 (and/or selecting) which volunteer node to use for the compute job. For example, in some implementations, stream process 10 may only volunteer resources when a WiFi connection to the internet is available. In some implementations, stream process 10 may enable a change of setting to allow for a specified quota of data to be used daily, monthly, etc. for volunteer computation when not connected to WiFi. This may be advantageous, e.g., when sometimes there is limited connectivity or the network (e.g., 4G) connection is faster than the WiFi, e.g., public coffee shop WiFi. In some implementations, upon a WiFi connection being lost by the volunteer compute node, stream process 10 may not immediately quit, but may "gracefully" handover to, e.g., 4G or other connection and disconnect once the assigned computation can be migrated to another volunteer. In some implementations, if 4G (or other network) is not available as a handover, this may be monitored by stream process 10 for inclusion in the communication reputation factor.

In some implementations, Stream process 10 may determine 308 whether to add additional tuples to further replicate one or more sections of the streams graph. Replication of stream tuples may be necessary for computation verification. Even for a simple stream graph when operator replication is performed within the graph, this may result in a wide resulting graph that begins to look more like a tree, which may not be desired. The example stream graphs 400 and 402 shown in FIG. 4 may help illustrate the result. On the left is a simple stream graph 400 with a source, three operator tasks, and a sink. On the right, for the resulting replication stream graph 402, every operator may be replicated by stream process 10 and the sink operator (via stream process 10) may perform the computation verification task on the 27 result tuples.

In some implementations, stream process 10 may help to address this by, e.g., verifying individual computation steps rather than verifying final result tuples of the graph. Tuples/tasks may continue to be replicated as prescribed, but rather than sending to new/different volunteer compute nodes to perform the next computation, they may be sent to a shared set for each operator task. That shared set may perform the verification and compute the next operator task from the graph. The example resulting graph 500 shown in example FIG. 5, has fewer network communications while preserving the replication and verification desired.

In some implementations, the verification mechanism may be a byte-to-byte comparison of tuple data, a separate binary retrieved by stream process 10, etc. In some implementations, tuples received may have matching IDs, or other mechanism to identify which tuples need to be compared/verified together.

In some implementations, in the event of operator failure (e.g., did not perform a graceful handoff, one or more tuples may not arrive immediately and may be delayed as a new volunteer compute node is started and state is being recovered. If an operator receiving the delayed tuples has all of the other corresponding tuples to verify (e.g., minimum of 2 for each stream tuple computation), then the operator may perform the verification and aggressively continue processing if all received tuples' data matched. In some implementations, delayed tuples in that case may end up being discarded by stream process 10.

In some implementations, after analysis of the reputations of the volunteers available for a streams compute job, stream process 10 may dynamically determine 308 whether to add additional tuples (e.g., 3 or more total tuple duplicates) to further replicate sections or the entire streams graph. In some implementations, the customer driven job requirements may also influence the determination 308 whether to replicate. Either to triple(+) verify a tuple computation or better protect against delays if a volunteer were to disconnect.

In some implementations, identification 304 of the second compute node may be prioritized based upon, at least in part, the first compute node being in a different geographic region than the second compute node. Being local is not a guarantee for communication benefits, nor should a volunteer compute node be excluded from contributing if they are the only one in their locality. Link quality in terms of speed and consistency may build a volunteer compute node's reputation. For example, the higher reputation nodes may have higher priority in being selected by stream process 10 for a streams job and tasked with more critical roles like communicating with sources and sinks in the streams graph where consistency is critical.

In some implementations, when triple(+) replicated still at least 2 geographic regions may be prioritized, which may result in 2 of the 3 replications being executed in the same region. This may protect from larger foreseen dynamic cloud issues, e.g., 1) a group of volunteers (a cluster) trying to cheat the system, 2) geographical communication outages (e.g., when a cell tower or the entire location site internet goes down), 3) Time zone issues (e.g., the east coast unplugs their cell phones in the morning and goes to work all an hour earlier than Chicago, which may represent significant swings in resource availability and needs for task migrations).

In some implementations, stream process 10 may transmit 312 a prioritized list of at least the portion of the plurality of voluntary compute nodes to at least one of a first and second compute node of at least the portion of the plurality of voluntary compute nodes. For example, the above-noted volunteers (via their respective client electronic devices) may be able to communicate with other volunteers to receive/send the streaming data. In so-called "fog computing," many client electronic devices (such as those personal devices of the volunteers) may be sitting on the edge of the cloud. As an example of this, think of a company site (e.g., Company X) and all of its employee's, e.g., laptops and/or mobile devices. The employee's communication across, e.g., a local network should be far faster and reliable than communicating across longer distances. In some implementations, stream process 10 may prioritize mapping of stream operator tasks that communicate to volunteer resources (that may meet certain requirements associated with those attributes noted above) that are geographically close. This may help to implicitly take advantage of those locality communication benefits. In some implementations, and discussed above, the list of the available voluntary compute nodes for replication and/or computation may be prioritized using numerous attributes.

Figure 6:
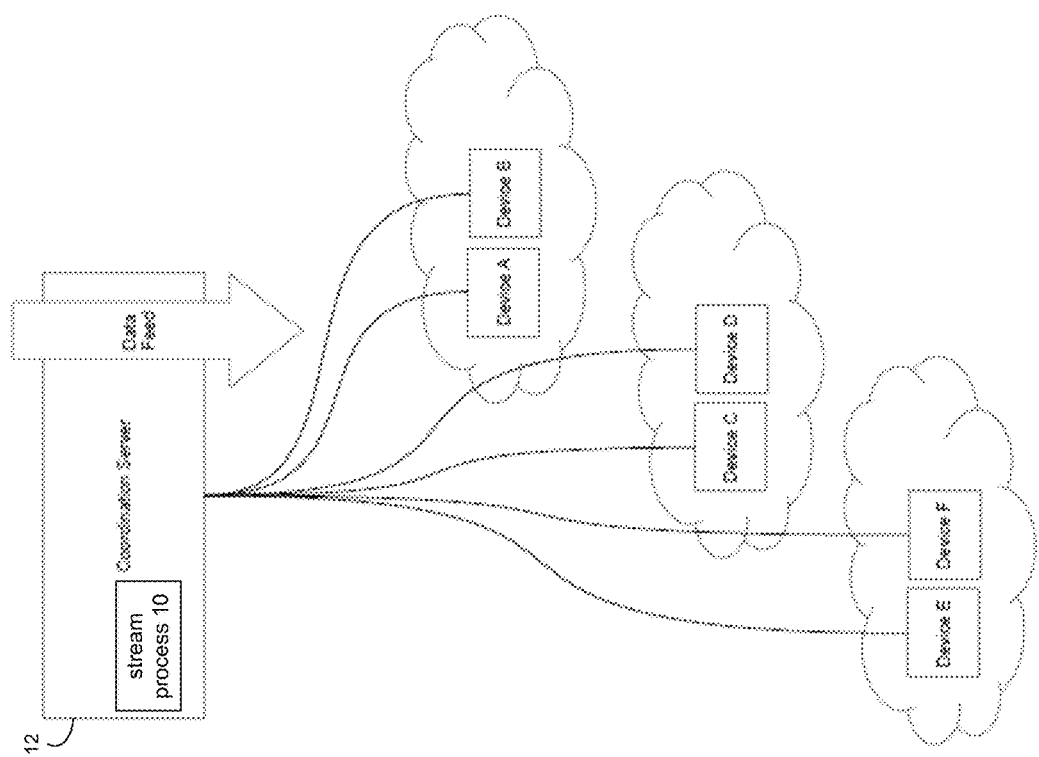
FIG. 6 is an example distributed computing network according to one or more example implementations of the disclosure.
Figure 7:
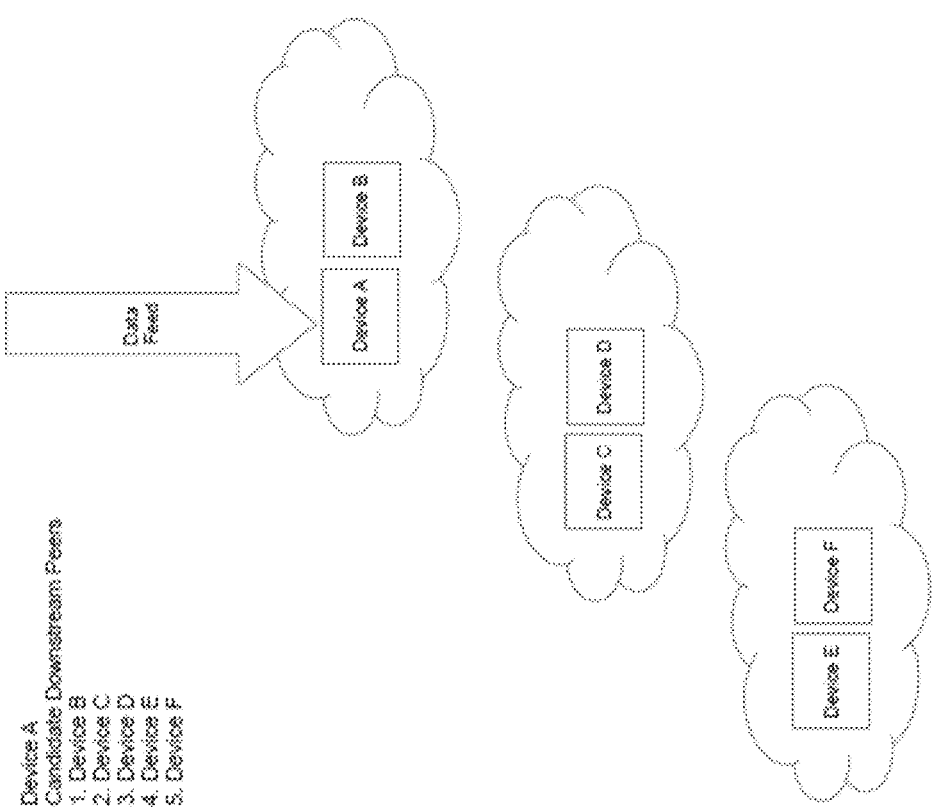
FIG. 7 is an example distributed computing network according to one or more example implementations of the disclosure.
Figure 8:
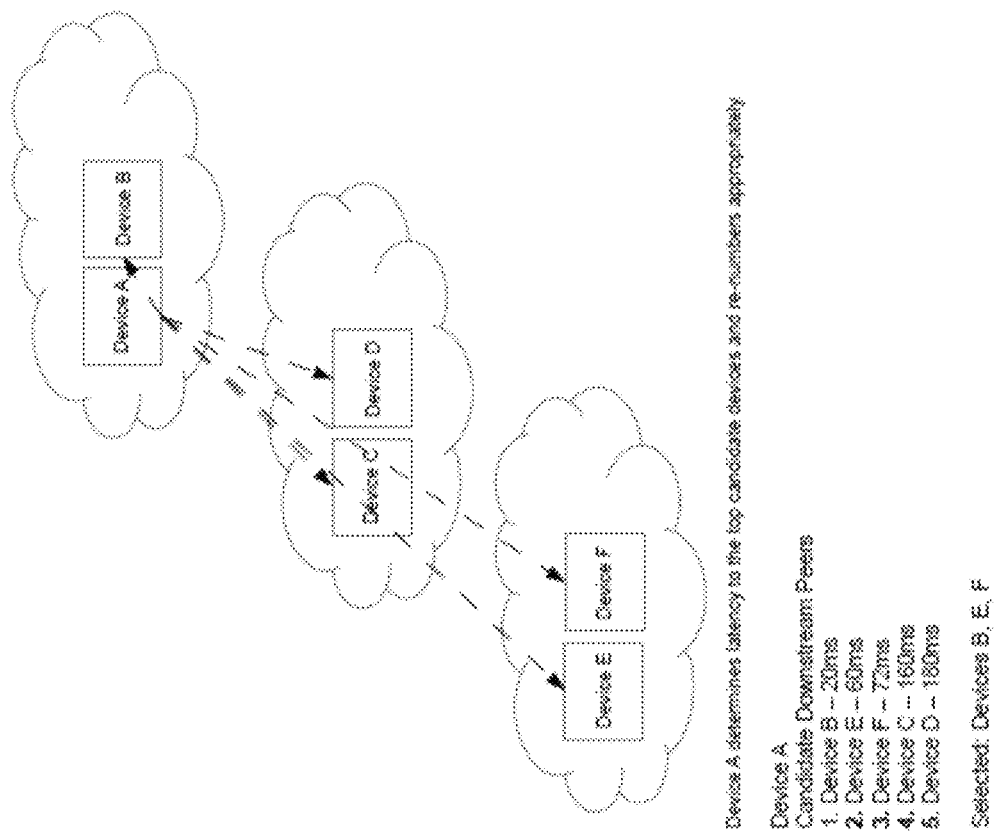
FIG. 8 is an example distributed computing network according to one or more example implementations of the disclosure.

In some implementations, and referring at least to example network 600 in example FIGS. 6, 7, and 8, when stream process 10 is identifying 302/304 and selecting what volunteer compute devices to replicate to, an objective ranking may be applied to the candidate volunteer compute nodes. For example, stream process 10 may take the above-noted volunteer compute nodes identified 300 as having appropriate processing and network capacity. As noted above, stream process 10 may determine volunteer compute nodes within an availability zone. In some implementations, stream process 10 may use at least 2 availability zones to generate a prioritized list of volunteer compute nodes based on the appropriate processing and network capacity.

In some implementations, stream process 10 may transmit 312 the prioritized list to each volunteer compute node (e.g., Devices A-F, which may be referred to as the above-noted client electronic devices and volunteer compute nodes) that has been selected as a processing node. As shown in FIGS. 7-8, each client electronic device (via stream process 10) may profile the top candidates from its list and may revise the ranking given the above-noted attributes. As shown in FIG. 7, Devices A-F have been accepted by the server and may now be considered part of the "fog cloud." In the example, Device A has been identified 302 and selected as the first processing node, where Device A may send its results to, e.g., 3 in this non-limiting example, other Devices (e.g., Devices B, E, and F as shown in FIG. 8.)

In some implementations, network routing may vary with each destination (device) and a good connection to the server does not guarantee a good connection to a peer volunteer compute node. Thus, in some implementations, the list of peer volunteer compute nodes (as shown in FIG. 7) may be updated to reflect actual peer connectivity (as shown in FIG. 8). The required number of peer volunteer compute nodes, as determined above, may be selected by stream process 10, with at least one volunteer compute node being selected from another availability zone in some implementations. Based upon the prioritized list, the connections to downstream peer volunteer compute nodes may be established and data may flow for analysis, e.g., until an interruption is encountered or the result is finished. In some implementations, if an interruption is encountered by stream process 10, stream process 10 may re-query the server for the list and may again profile the top candidates from the list and revise the rankings.

In some implementations, stream process 10 may send 306 a final result tuples of the graph to the client computing device. In some implementations, this may involve the final result tuples of the graph being sent to the server, and then to the client computing device, or directly to the client computing device.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    identifying, in a dynamically formed cloud, a plurality of voluntary compute nodes, wherein the plurality of voluntary compute nodes include personal computing devices of a plurality of users, and wherein at least a portion of the plurality of voluntary compute nodes are configured to communicate with each other to receive and send streaming data;
    identifying a first compute node of at least the portion of the plurality of voluntary compute nodes to receive and distribute a streams operator of a streams graph requested by a client computing device;
    applying an objective ranking to generate a prioritized list of the plurality of voluntary compute nodes, based on appropriate processing capacity and network capacity, wherein the plurality of voluntary compute nodes with a higher ranking are tasked with more critical roles in the streams graph;
    identifying a second compute node, from the prioritized list of the plurality of voluntary compute nodes, for verifying computational correctness of a tuple stream computation for the stream operator;
    replicating the tuple stream computations for the stream operator;
    verifying individual computation steps, via a byte-to-byte comparison of tuple data, rather than verifying final result tuples of the streams graph, in order to prevent the stream graphs from becoming exponentially wide as the tuple stream computations are replicated;
    verifying the replicated tuple stream computations as a shared set prior to distributing to a new voluntary compute node for a next computation;
    distributing the replicated tuple stream computations to the identified second compute node; and
    sending a final result tuples of the graph to the client computing device.

2. The computer-implemented method of claim 1 further comprising determining whether to add additional tuples to further replicate one or more sections of the streams graph.

3. The computer-implemented method of claim 1 wherein at least one of the first and second compute nodes is identified based upon, at least in part, one or more attributes of at least one of the first and second compute nodes.

4. The computer-implemented method of claim 3 wherein the one or more attributes include one or more of geographic location, availability of memory resources, availability of CPU resources, connection speed, reputation, a threshold battery life, a battery charging state, and connection state to a wireless fidelity network.

5. The computer-implemented method of claim 4 further comprising performing a graceful handover of the tuple stream computation to a third compute node of at least the portion of the plurality of voluntary compute nodes based upon, at least in part, at least a portion of the one or more attributes.

6. The computer-implemented method of claim 1 further comprising transmitting the prioritized list of the plurality of voluntary compute nodes to at least one of the first and second compute nodes.

7. The computer-implemented method of claim 1 wherein identification of the second compute node is prioritized based upon, at least in part, the first compute node being in a different geographic region than the second compute node.

8. A computer program product residing on a computer readable storage medium having a plurality of instructions stored thereon which, when executed across one or more processors, causes at least a portion of the one or more processors to perform operations comprising:
    identifying, in a dynamically formed cloud, a plurality of voluntary compute nodes, wherein the plurality of voluntary compute nodes include personal computing devices of a plurality of users, and wherein at least a portion of the plurality of voluntary compute nodes are configured to communicate with each other to receive and send streaming data;
    applying an objective ranking to generate a prioritized list of the plurality of voluntary compute nodes, based on appropriate processing capacity and network capacity, wherein the plurality of voluntary compute nodes with a higher ranking are tasked with more critical roles in the streams graph;
    identifying a second compute node, from the prioritized list of the plurality of voluntary compute nodes, for verifying computational correctness of a tuple stream computation for the stream operator;
    replicating the tuple stream computations for the stream operator;
    verifying individual computation steps, via a byte-to-byte comparison of tuple data, rather than verifying final result tuples of the streams graph, in order to prevent the stream graphs from becoming exponentially wide as the tuple stream computations are replicated;
    verifying the replicated tuple stream computations as a shared set prior to distributing to a new voluntary compute node for a next computation;
    distributing the replicated tuple stream computations to the identified second compute node; and
    sending a final result tuples of the graph to the client computing device.

9. The computer program product of claim 8 further comprising determining whether to add additional tuples to further replicate one or more sections of the streams graph.

10. The computer program product of claim 8 wherein at least one of the first and second compute nodes is identified based upon, at least in part, one or more attributes of at least one of the first and second compute nodes.

11. The computer program product of claim 10 wherein the one or more attributes include one or more of geographic location, availability of memory resources, availability of CPU resources, connection speed, reputation, a threshold battery life, a battery charging state, and connection state to a wireless fidelity network.

12. The computer program product of claim 11 further comprising performing a graceful handover of the tuple stream computation to a third compute node of at least the portion of the plurality of voluntary compute nodes based upon, at least in part, at least a portion of the one or more attributes.

13. The computer program product of claim 8 further comprising transmitting the prioritized list of the plurality of voluntary compute nodes to at least one of the first and second compute nodes.

14. The computer program product of claim 8 wherein identification of the second compute node is prioritized based upon, at least in part, the first compute node being in a different geographic region than the second compute node.

15. A computing system including one or more processors and one or more memories configured to perform operations comprising:
   identifying, in a dynamically formed cloud, a plurality of voluntary compute nodes, wherein the plurality of voluntary compute nodes include personal computing devices of a plurality of users, and wherein at least a portion of the plurality of voluntary compute nodes are configured to communicate with each other to receive and send streaming data;
   applying an objective ranking to generate a prioritized list of the plurality of voluntary compute nodes, based on appropriate processing capacity and network capacity, wherein the plurality of voluntary compute nodes with a higher ranking are tasked with more critical roles in the streams graph;
   identifying a second compute node, from the prioritized list of the plurality of voluntary compute nodes, for verifying computational correctness of a tuple stream computation for the stream operator;
   replicating the tuple stream computations for the stream operator;
   verifying individual computation steps, via a byte-to-byte comparison of tuple data, rather than verifying final result tuples of the streams graph, in order to prevent the stream graphs from becoming exponentially wide as the tuple stream computations are replicated;
   verifying the replicated tuple stream computations as a shared set prior to distributing to a new voluntary compute node for a next computation;
   distributing the replicated tuple stream computations to the identified second compute node; and
   sending a final result tuples of the graph to the client computing device.

16. The computing system of claim 15 further comprising determining whether to add additional tuples to further replicate one or more sections of the streams graph.

17. The computing system of claim 15 wherein at least one of the first and second compute nodes is identified based upon, at least in part, one or more attributes of at least one of the first and second compute nodes.

18. The computing system of claim 17 wherein the one or more attributes include one or more of geographic location, availability of memory resources, availability of CPU resources, connection speed, reputation, a threshold battery life, a battery charging state, and connection state to a wireless fidelity network.

19. The computing system of claim 18 further comprising performing a graceful handover of the tuple stream computation to a third compute node of at least the portion of the plurality of voluntary compute nodes based upon, at least in part, at least a portion of the one or more attributes.

20. The computing system of claim 15 further comprising transmitting the prioritized list of the plurality of voluntary compute nodes to at least one of the first and second compute nodes.

* * * * *